United States Patent
Lin et al.

(10) Patent No.: US 7,787,202 B2
(45) Date of Patent: Aug. 31, 2010

(54) GUIDED TARGET SEARCH FOR HARD DISK DRIVE APPLICATIONS

(75) Inventors: Xiaotong Lin, San Jose, CA (US); Andrei E. Vityaev, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 964 days.

(21) Appl. No.: 11/595,770

(22) Filed: Nov. 10, 2006

(65) Prior Publication Data

US 2008/0007854 A1    Jan. 10, 2008

Related U.S. Application Data

(60) Provisional application No. 60/819,767, filed on Jul. 10, 2006.

(51) Int. Cl.
*G11B 5/09* (2006.01)
*G11B 20/14* (2006.01)
*G11B 20/16* (2006.01)
*H03H 7/30* (2006.01)
*H03H 7/40* (2006.01)
*H03K 5/159* (2006.01)

(52) U.S. Cl. .......................... 360/39; 360/41; 375/232; 708/323

(58) Field of Classification Search ........................ None
See application file for complete search history.

(56) References Cited

U.S. PATENT DOCUMENTS 7,194,674 B2 *   3/2007   Okumura et al. ............ 714/795
7,440,208 B1 *  10/2008   McEwen et al. ............. 360/39

OTHER PUBLICATIONS

"A PRML System for Digital Magnetic Recording" by Roy D. Cideciyan et al., IEEE Journal on Selected Areas in Communications, vol. 10, No. 1, Jan. 1992, pp. 38-56.
"PRML detection boosts hard-disk drive capacity" by Kevin D. Fisher et al., The Practical Engineer, IEEE Spectrum, Nov. 1996, pp. 70-76.
"Equalization for Maximum Likelihood Detectors" by Jaekyun Moon et al., IEEE Transactions on Magnetics, vol. 31, No. 2, Mar. 1995, pp. 1083-1088.
"Equalization and Detection for Nonlinear Recording Channels with Correlated Noise" by Nick M. Zayed et al., IEEE Transactions on Magnetics, vol. 35, No. 5, Sep. 1999, 2295-2297.

* cited by examiner

*Primary Examiner*—Daniell L Negrón
(74) *Attorney, Agent, or Firm*—Garlick Harrison & Markison

(57) ABSTRACT

A technique to perform a guided partial response target search for characterizing a read channel of a disk drive. A target adaptation scheme pre-selects a plurality of targets from a pool of potential targets based on certain criteria and the selected targets are sorted in linear gradient orders. When target adaptation is being performed by comparing the equalizer output with an ideal reconstructed signal, a difference value sets a gradient vector that is used to determine which direction to move along the sorted list of targets to select the next target.

19 Claims, 12 Drawing Sheets

FIG. 7

Perpendicular Target [$t_0$ $t_1$] ($t_1 \geq t_0 > 0$) — Increase $t_0$ ↑ ; Increase $t_1$ →

| | | | | | | | | | |
|---|---|---|---|---|---|---|---|---|---|
| 14 14 | 14 15 | 14 16 | 14 17 | 14 18 | 14 19 | 14 20 | 14 21 | 14 22 | 14 23 |
| 13 13 | 13 14 | 13 15 | 13 16 | 13 17 | 13 18 | 13 19 | 13 20 | 13 21 | 13 22 |
| 12 12 | 12 13 | 12 14 | 12 15 | 12 16 | 12 17 | 12 18 | 12 19 | 12 20 | 12 21 |
| 11 11 | 11 12 | 11 13 | 11 14 | 11 15 | 11 16 | 11 17 | 11 18 | 11 19 | 11 20 |
| 10 10 | 10 11 | 10 12 | 10 13 | 10 14 | 10 15 | 10 16 | 10 17 | 10 18 | 10 19 |
| 9 9 | 9 10 | 9 11 | 9 12 | 9 13 | 9 14 | 9 15 | 9 16 | 9 17 | 9 18 |
| 8 8 | 8 9 | 8 10 | 8 11 | 8 12 | 8 13 | 8 14 | 8 15 | 8 16 | 8 17 |
| 7 7 | 7 8 | 7 9 | 7 10 | 7 11 | 7 12 | 7 13 | 7 14 | 7 15 | 7 16 | step 1: linear gradient guided search vertically along single column $t_0=0$ optimum target for $t_0=0$ column step 2: linear gradient guided search horizontally along single row final optimum target

GUIDED TARGET SEARCH FOR HARD DISK DRIVE APPLICATIONS

CROSS REFERENCE TO RELATED APPLICATION

This application claims the benefit of priority to U.S. Provisional Patent Application Ser. No. 60/819,767; filed Jul. 10, 2006; and titled "Guided target search for hard disk drive applications," which is incorporated herein by reference.

BACKGROUND OF THE INVENTION

1. Technical Field of the Invention

The embodiments of the invention relate generally to disk drives and, more particularly, to providing a guided search for a target to set up a disk drive.

2. Description of Related Art

Varieties of memory storage devices, such as magnetic disk drives, are available to store data and are used to provide data storage for a host device, either directly, or through a network. Those networks may be a storage area network (SAN) or a network attached storage (NAS). Typical host devices include stand alone computer systems such as a desktop or laptop computer, enterprise storage devices such as servers, storage arrays such as a redundant array of independent disk (RAID) arrays, storage routers, storage switches and storage directors, and other consumer devices such as video game systems and digital video recorders. These devices generally provide high storage capacity in a cost effective manner.

Within some of these memory storage devices, there may be performance issues associated when performing timing recovery of a signal that is read from the disk. That is, appropriate digital sampling is performed for accurate and effective recovery of the information from signals read from the disk. For example, if improper or inadequate digital sampling is performed on the signal that is read from the disk, then some of the data recovered may be inaccurate or not recovered at all. In some instances, the system may try to re-read the data (e.g., via a re-try) requiring additional time. Furthermore, in devices where energy consumption is a concern (e.g., small hand held devices and/or battery operated devices), performing more data accesses than necessary may reduce the operational capabilities of the battery.

In order to continually improve the data read capabilities of storage devices, such as hard disk drives (HDD), various sampling techniques may be implemented or enhanced to read, sample and recover the stored data. These sampling techniques may also be used to monitor markers placed on the disk, which markers are used to control the synchronization and/or speed of the disk drive. In reading the data from a HDD, the disk drive is brought up to operational speed and then the data is read from a given sector of a storage disk. In some instances where battery life is a concern, to conserve battery life, the HDD is actively on as little as possible while still maintaining a low data error rate.

In a typical HDD, a channel for reading the data from a disk is referred to as a read channel. The read channel may employ one of a variety of techniques to read signals from the disk and convert the read signals into 0s and 1s that correspond to the data that was originally stored on the disk. If the HDD uses a magnetic disk as the medium to store the written data, the data is retained on the disk as aligned magnetic fields. The magnetic fields may have horizontal or vertical alignment on the medium depending on which alignment scheme is used. Generally, each field alignment is given +1 or −1 in bi-polar NRZ representation corresponding to opposite magnetization direction, which can be mapped to digital 1s and 0s respectively.

In recovering the stored data from a magnetic disk, a magnetic pick-up head reads the field alignment as the head traverses over the disk. The head sends the picked-up signal to the read channel circuitry of the HDD in order to sample and detect the read signal from the head and generate a detected signal which, corresponds to the original stored signal, if done properly.

A variety of read channel technologies are available for detecting the read signal from the disk. Common techniques are run-length limited coding and peak detection. More recently, partial-response, maximum likelihood (PRML) detection has been implemented in read channels of magnetic HDDs to address recovery of data from high density disks. PRML is a technique that uses sampling that allows a sequence of bits to be detected, instead of individual bits, and increases the detection capabilities on higher capacity HDDs. PRML detection is further described in 1) "A PRML System for Digital Magnetic Recording" by Roy D. Cideciyan et al., IEEE Journal on Selected Areas in Communications, Vol. 10, No. 1, January 1992, pages 38-56; and in 2). "PRML detection boosts hard-disk drive capacity" by Kevin D. Fisher et al., The Practical Engineer, IEEE Spectrum, November 1996, pages 70-76.

In implementing a PRML system, a common technique is to equalize the read channel response so that some form of detection, such as Viterbi Algorithm, may be applied to detect the signal. In order to obtain the adaptive equalization for the read channel, partial response (PR) targets are selected that closely matches the channel response. Equalization techniques are described in 3) "Equalization for Maximum Likelihood Detectors" by Jaekyun Moon et al., IEEE Transactions on Magnetics, Vol. 31, No. 2, March 1995, pages 1083-1088; and in 4) "Equalization and Detection for Nonlinear Recording Channels with Correlated Noise" by Nick M. Zayed et al., IEEE Transactions on Magnetics, Vol. 35, No. 5, September 1999, pages 2295-2297. Generally, a Finite Impulse Response (FIR) filter is employed in which the coefficients of the filter may be changed for a given target response.

In order to obtain the proper equalization in the read channel, one technique is to fix a target response for the read channel that is desirable and, then, find optimal FIR coefficients corresponding to the target when designing a detector. However, this technique is limiting since the target is fixed and cannot easily accommodate for a variety of channels (with different drive head and media combinations). Another technique is to search for the right target from a pool of possible targets by formulation based on approximation of bit error rate (BER) to derive the PR value and then searching for the optimal target from the pool. Although these techniques may obtain acceptable PR targets, the techniques are not as flexible and/or involve significant computation/search to obtain the optimal target.

Accordingly, there is a need for another technique to obtain PR targets.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

BRIEF DESCRIPTION OF THE SEVERAL VIEWS OF THE DRAWINGS

FIG. 7 shows an embodiment of a look up table for locating a 2-tap perpendicular target.

DETAILED DESCRIPTION OF THE EMBODIMENTS OF THE INVENTION

The embodiments of the present invention may be practiced in a variety of settings that implement a hard disk drive (HDD) or other memory storage devices that utilize a partial response target for characterizing a data channel. The technique is not limited to HDDs and may be implemented in other devices that have a data channel that use a sampling and detection scheme to receive and detect incoming data.

Figure 1:
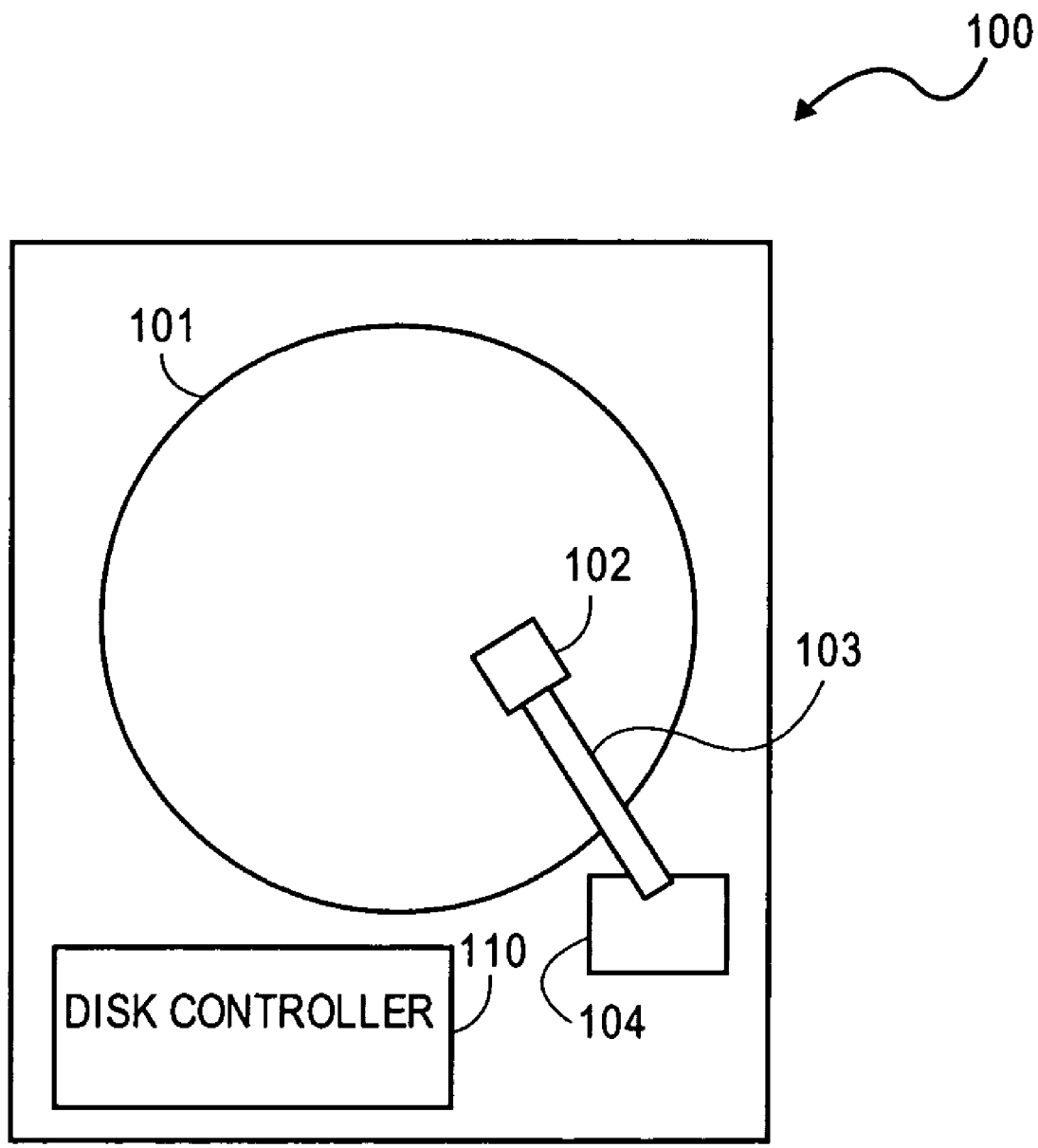
FIG. 1 shows an embodiment of a disk drive device for practicing the invention.

FIG. 1 illustrates an example embodiment of a disk drive 100 for practicing one embodiment of the invention. In particular, disk drive 100 is a HDD device that includes a disk 101 to store data. Disk 101 is typically rotated by a servo or motor (not shown) at a specified velocity depending on a particular application for its use. Disk 101 may be constructed from various materials and in one embodiment disk 101 is a magnetic disk that stores information as magnetic field changes on some type of magnetic medium. The medium may be rigid or non-rigid, although HDD devices generally have rigid disks. Disk 101 may be removable or non-removable. Disk 101 typically is made of magnetic material or coated with magnetic material. It is to be noted that in other embodiments, disk 101 may employ other data storage technology, such as an optical medium, and need not be limited to magnetic storage.

Disk drive 100 typically includes one or more read/write heads 102 that are coupled to an arm 103 that is moved by an actuator 104 over the surface of the disk 101 either by translation, rotation or both. Disk drive 100 may have one disk 101, or multiple disks with multiple read/write heads 102. Disk drive 100 includes a disk controller module 110 that is utilized for controlling the operation of the disk drive, including read and write operations to disk 102, as well as controlling the speed of the servo motor and the motion of actuator 104. Disk controller module 110 may also include an interface to couple to an external device, such as a host device. It is to be noted that disk drive 100 is but one example and other disk drives may be readily implemented to practice various embodiments of the invention.

Disk drive 100, or any other equivalent disk drive, may be implemented in a variety of devices. For example, disk drive 100 may be implemented in a handheld audio unit. In one such embodiment, disk drive 100 may include a small form factor magnetic hard disk that has a diameter of approximately 1.8" or smaller and incorporated into or otherwise used by handheld audio unit to provide general storage, including storage of audio content.

In another example embodiment, disk drive 100 may be implemented in a computer. In one such embodiment, disk drive 100 may include a small form factor magnetic hard disk that has a diameter of approximately 1.8", 2.5" or 3.5" for various applications, including enterprise storage applications. The hard disk is not limited to these dimensions and in some instances may be larger than 3.5 inches or smaller than 1.8 inches. Disk drive 100 is incorporated into or otherwise used by a computer to provide general purpose storage and the computer may be attached to a storage array, such as a redundant array of independent disks (RAID) array, storage router, edge router, storage switch and/or storage director. Disk drive 100 may be implemented in a variety of computers (or computing devices), such as desktop computers and notebook computers.

In another example embodiment, disk drive unit 100 may be implemented in a wireless communication device to provide general storage. In one such embodiment, the wireless communication device may communicate via a wireless telephone network such as a cellular, personal communications service (PCS), general packet radio service (GPRS), global system for mobile communications (GSM), integrated digital enhanced network (iDEN) or other wireless communications network capable of sending and receiving telephone calls. Furthermore, the wireless communication device may communicate via the Internet to access email, download content, access websites, and provide streaming audio and/or video programming. In this fashion, the wireless communication device may place and receive telephone calls, text messages, short message service (SMS) messages, pages and other data messages that may include attachments such as documents, audio files, video files, images and other graphics.

Still as another example, disk drive 100 may be implemented in the personal digital assistant (PDA). In one such embodiment, disk drive 100 may include a small form factor magnetic hard disk to provide general data storage.

In these various embodiments for disk drive 100, a variety of data, as well as program instructions, may be stored. Stored data may include, and is not limited to, general data, data for motion picture expert group (MPEG) audio layer 3 (MP3) files or Windows Media Architecture (WMA) files, video content such as MPEG4 files, JPEG (Joint Photographic Expert Group) files, bitmap files and files stored in other graphics formats, emails, webpage information and other information downloaded from the Internet, address book information, and/or any other type of information that may be stored on a disk medium.

Figure 2:
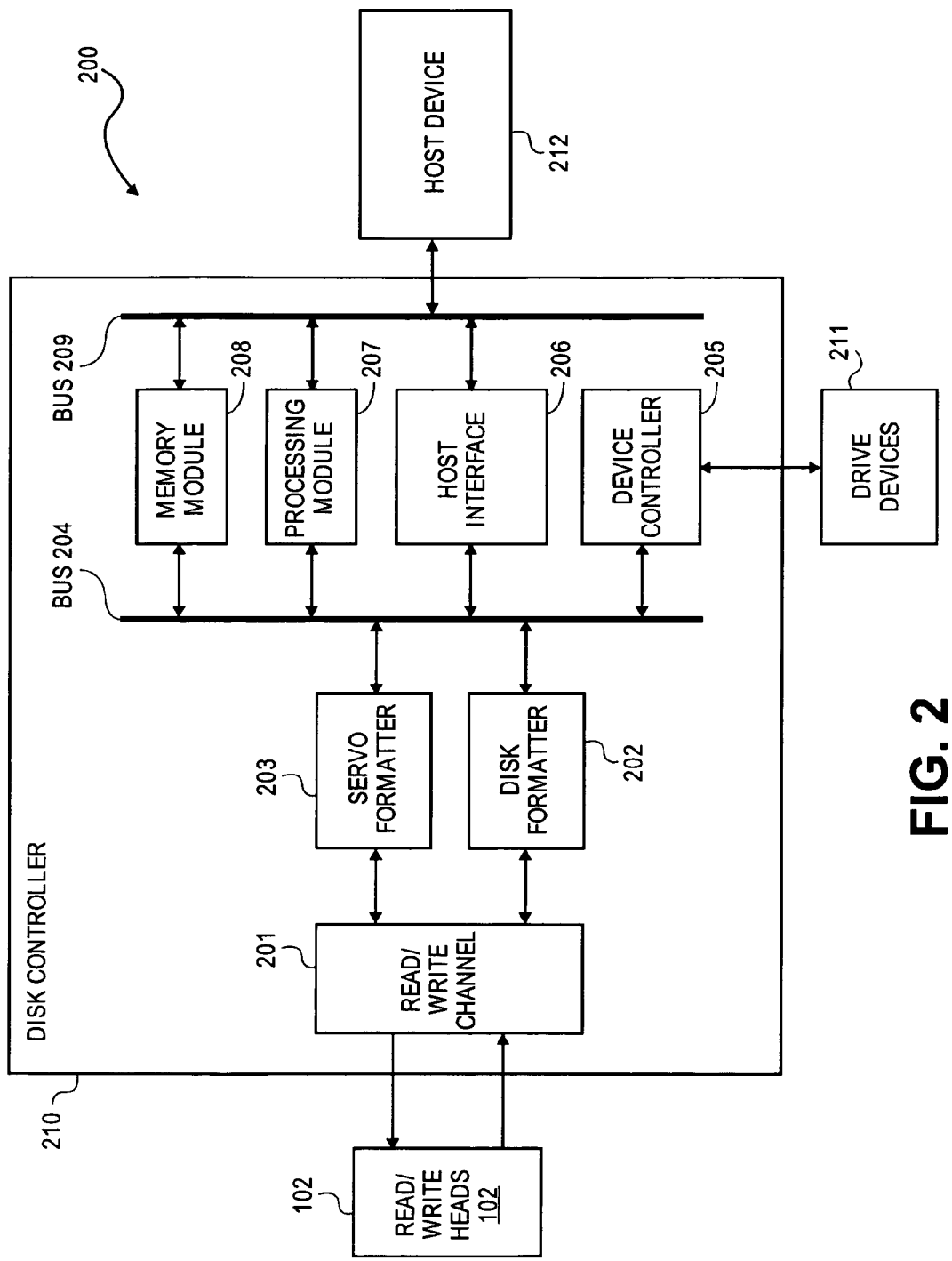
FIG. 2 shows one embodiment of an apparatus that has a disk controller that implements the invention.

FIG. 2 illustrates an embodiment of an apparatus 200 that may be implemented with disk drive 100 of FIG. 1. Read/write head 102 is shown coupled to a disk controller 210, which may be used for disk controller 110 of FIG. 1. In the particular embodiment, disk controller 210 includes a read/write channel 201 coupled to head 102 for reading and writing data to and from disk 101. A disk formatter 202 is included for controlling the formatting of data and provides clock signals and other timing signals that control the flow of the data written to, and data read from disk 101 through read/write channel 201. A servo formatter 203, also coupled to read/write channel 201, provides clock signals and other control and timing signals based on servo control data read from disk 101. Disk formatter 202 and servo formatter 203 are also coupled to bus 204. Disk controller 210 further includes a device controller 205, host interface 206, processing module 207 and memory module 208, as well as a second bus 209. Device controller 205 controls the operation of a drive device(s) 211. Device(s) 211 may be devices such as actuator 104 and the servo (or spindle) motor used to rotate disk 101. Host interface 206 is coupled to a host device 212 to receive commands from host device 212 and/or transfer data between host 212 and disk 101 in accordance with a particular protocol.

Processing module 207 may be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions. The operational instructions may reside in memory module 208 or may reside elsewhere. When processing module 207 is implemented with two or more devices, each device may perform the same steps, processes or functions in order to provide fault tolerance or redundancy. Alternatively, the function, steps and processes performed by processing module 207 may be split between different devices to provide greater computational speed and/or efficiency.

Memory module 208 may be a single memory device or a plurality of memory devices. Such a memory device may be a read-only memory (ROM), random access memory (RAM), volatile memory, non-volatile memory, static random access memory (SRAM), dynamic random access memory (DRAM), flash memory, cache memory, and/or any device that stores digital information. It is to be noted that when processing module 207 implements one or more of its functions via a state machine, analog circuitry, digital circuitry, and/or logic circuitry, memory module 208 storing the corresponding operational instructions may be embedded within, or reside external to, the circuitry comprising the state machine, analog circuitry, digital circuitry, and/or logic circuitry. Furthermore, memory module 208 stores, and the processing module 207 executes, operational instructions that may correspond to one or more of the steps or a process, method and/or function illustrated herein.

Each of these elements of controller 210 may be implemented in hardware, firmware, software or a combination thereof, in accordance with the broad scope of the present invention. While a particular bus architecture is shown in FIG. 2 with buses 204, 209, alternative bus architectures that include either a single bus configuration or additional buses are likewise possible to be implemented as different embodiments.

In one embodiment, one or more modules of disk controller 210 are implemented as part of a system on a chip (SoC) integrated circuit. In the particular embodiment shown, disk controller 210 is part of a SoC integrated circuit that may include other circuits, devices, modules, units, etc., which provide various functions such as protocol conversion, code encoding and decoding, power supply, etc. In other embodiments, the various functions and features of disk controller 210 may be implemented in a plurality of integrated circuits that communicate and combine to perform the functionality of disk controller 210.

When the drive unit 100 is manufactured, disk formatter 203 generally writes a plurality of servo wedges along with a corresponding plurality of servo address marks at equal radial distance along the disk 101. The servo address marks are used by the timing generator for triggering a "start time" for various events employed when accessing the media of the disk 101.

Figure 3:
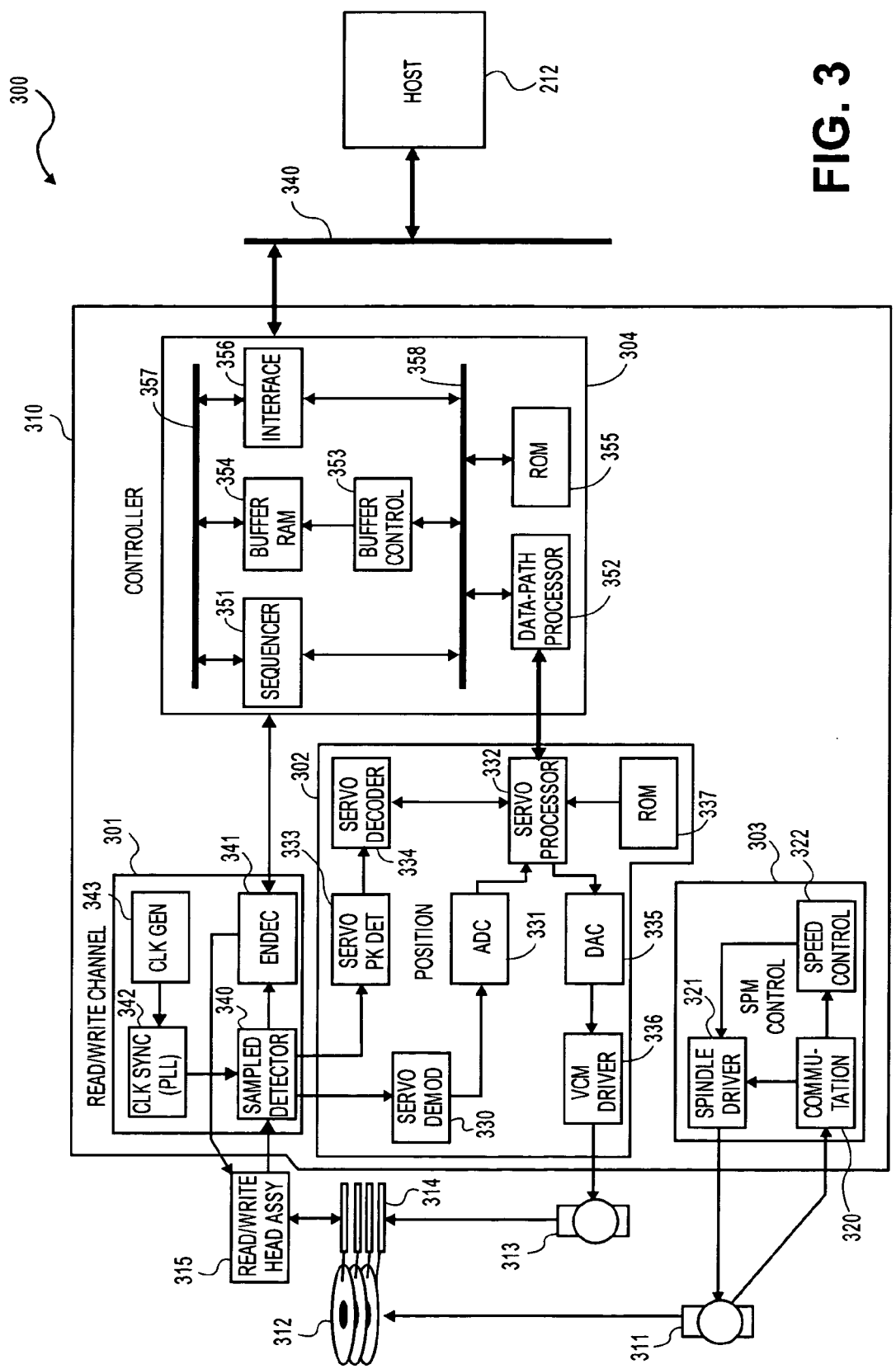
FIG. 3 shows another embodiment of an apparatus that includes a disk controller that implements the invention.

FIG. 3 illustrates another embodiment of an apparatus 300 that may be implemented with disk drive 100 of FIG. 1. Apparatus 300 includes a disk controller 310, which may be used for disk controller 110 of FIG. 1. In this particular embodiment, disk controller 310 includes a read/write channel module 301, position module 302, spindle motor (SPM) control module 303 and controller module 304. As shown, disk controller 310 is integrated on an integrated circuit chip and in some embodiments, disk controller 310 may also be implemented as a SoC. Alternatively, as noted above, disk controller 310 may be implemented in multiple chips, or even as discreet components.

Apparatus 300 of FIG. 3 is shown having a spindle servo or motor 311, which turns one or more disks 312. In the illustration, multiple disks 312 are shown. However, the disk drive may only have one disk in other embodiments. Hereinafter, the description refers to disks 312, but it is understood that there may only be one disk present. The disks 312 may be rigid or non-rigid, but in typical HDD units, the disks 312 are rigid media for storing data.

Apparatus 300 also includes an actuator servo (or motor) 313 to move read/write head or heads 314. Read/write heads 314 are part of a read/write head assembly 315 which read data from disks 312, as well as write data to disks 312. In some embodiments, head assembly 315 may include a preamplifier to provide preamplification of data read from disks 312.

In the embodiment of FIG. 3, SPM control module 303 includes a commutation module 320 to monitor the speed of spindle motor 311, a spindle driver 321 to drive the spindle motor 311, and a speed control module 322 to control the spindle driver based on the input provided by commutation module 320.

Likewise, position module 302 is used to control head actuator servo 313 to precisely place the heads 314 over a desired location on disks 312 to read or write data. The position module 302 includes a servo demodulator 330 to demodulate signals from read/write channel module 301 and the demodulated output from servo demodulator 330 is coupled to an analog-to-digital converter (ADC) 331. The servo demodulator 330 thus provides finer head position information. ADC 331 converts the analog demodulated signal to a digital form for input to a servo processor 332. A second signal path from read/write channel module 301 is coupled to a servo peak detector 333, which detects servo data 0s or 1s by comparing read-back waveform amplitude with a certain threshold. The output of peak detector 333 is then decoded by servo decoder 334 for input to processor 332. The demodulated and decoded information is processed by processor 332 and utilized to generate drive signals to the voice coil motor (VCM) driver 336. A digital-to-analog converter (DAC) 335 is used to convert digital control signals from processor 332 into analog form. VCM driver 336 then uses the control signals to operate actuator servo 313. A memory 337, shown as a ROM, is included to store instructions to operate processor 332.

Read/write channel module 301 includes a sampled detector 340 for sampling and detecting a read signal from assembly 315. The analog read data from the disk is coupled to detector 340, via head assembly 315, to be sampled and detected. The detected signal is coupled to encoder/decoder (ENDEC) module 341 to be decoded. Typically, detector 340 has an ADC to provide analog-to-digital conversion. ENDEC module 341 then decodes digital form of the sampled/detected read data and couples the read data to controller module 304. Outputs from detector 340 are also coupled to demodulator 330 and detector 333. During a write operation, ENDEC module 341 receives digital data from controller module 304 and encodes the data for writing to the disk through head assembly 315.

Read/write channel module 301 includes a clock generator 343 to provide a reference clock for generating other timing and/or clock signals for use by one or more components of disk controller 310. In other embodiments, the reference clock may be provided from a clock source external to disk controller 310, or even apparatus 300. A clock synchronizer module 342 receives the reference clock and generates clocking or timing signals for coupling to detector 340. In one embodiment, synchronizer 342 uses a phase-locked-loop (PLL) to synchronize the sampling timing of detector 340 when sampling data from disks 312.

ENDEC 341 is coupled to sequencer 351 of controller module 304 for transfer of data between read/write module 301 and controller module 304. Controller module 304 includes sequencer 351, data-path processor 352 and its memory (in way of a ROM) 355, buffer memory (shown as a RAM) 354, buffer control circuitry 353 and interface 356. As noted above, sequencer 351 provides for the transfer of data between modules 301, 304. Buffer 354, under control of buffer control circuitry 353, stores data that is to be written to the disk or was read from the disk. Interface 356 is used to interface disk controller 310 with host 212 via bus 340. As shown, bus 357 is used as an internal bus for data transfer among sequencer 351, buffer 345 and interface 356.

As noted in FIG. 3, a second bus 358 is used to couple control and data signals between various devices on controller module 304. Data-path processor 352 is coupled to bus 358 for transfer of control and/or data signals. ROM 355, also coupled to bus 358, is utilized to store instructions which operate on processor 352. It is to be noted that specific circuit nomenclature, such as RAM and ROM, are provided as examples only and various other memory devices (both internal or external to disk controller 310) may be utilized. Again, as noted above, although specific components are shown, they need not be limited to such components. Thus, shown processors may be microprocessors, processing modules, state machines, microcode, etc.

As earlier described in the Background section above, higher capacity and/or density HDD devices may implement partial-response, maximum likelihood (PRML) detection to read data from the disk. Accordingly, when a disk controller, such as disk controller 210 or 310, is employed to read data from a disk, PRML detection is employed in the read channel portion of the disk controller. Known PRML techniques equalize channel to a pre-determined partial response (PR) target (usually an n-tap filter represented as $\{t_i\}$, i=0, ..., n−1). The definition of channel includes the combined channel response for data writing from write heads to recording media, recording media, data reading from media and all other analog circuitries and/or digital processing blocks that read-back waveforms pass through till they reach detector. In order to obtain the optimum performance out of the channel detector (e.g., in terms of bit error rate (BER) metric), an optimal partial-response target is selected that match the channel response best. The optimal PR target differs due to a wide range of conditions, such as different head/media combinations from different HDD manufacturers, different channel bit density (CBD) and different noise conditions, etc. Therefore, programmable PR targets are often provided to accommodate for different application conditions. The embodiments of the invention described below use a guided target adaptation to obtain the desired targets. As noted below, the guided target approach allows a more flexible and/or rapid scheme to obtain the optimal target(s) to be used with a particular HDD.

Figure 4:
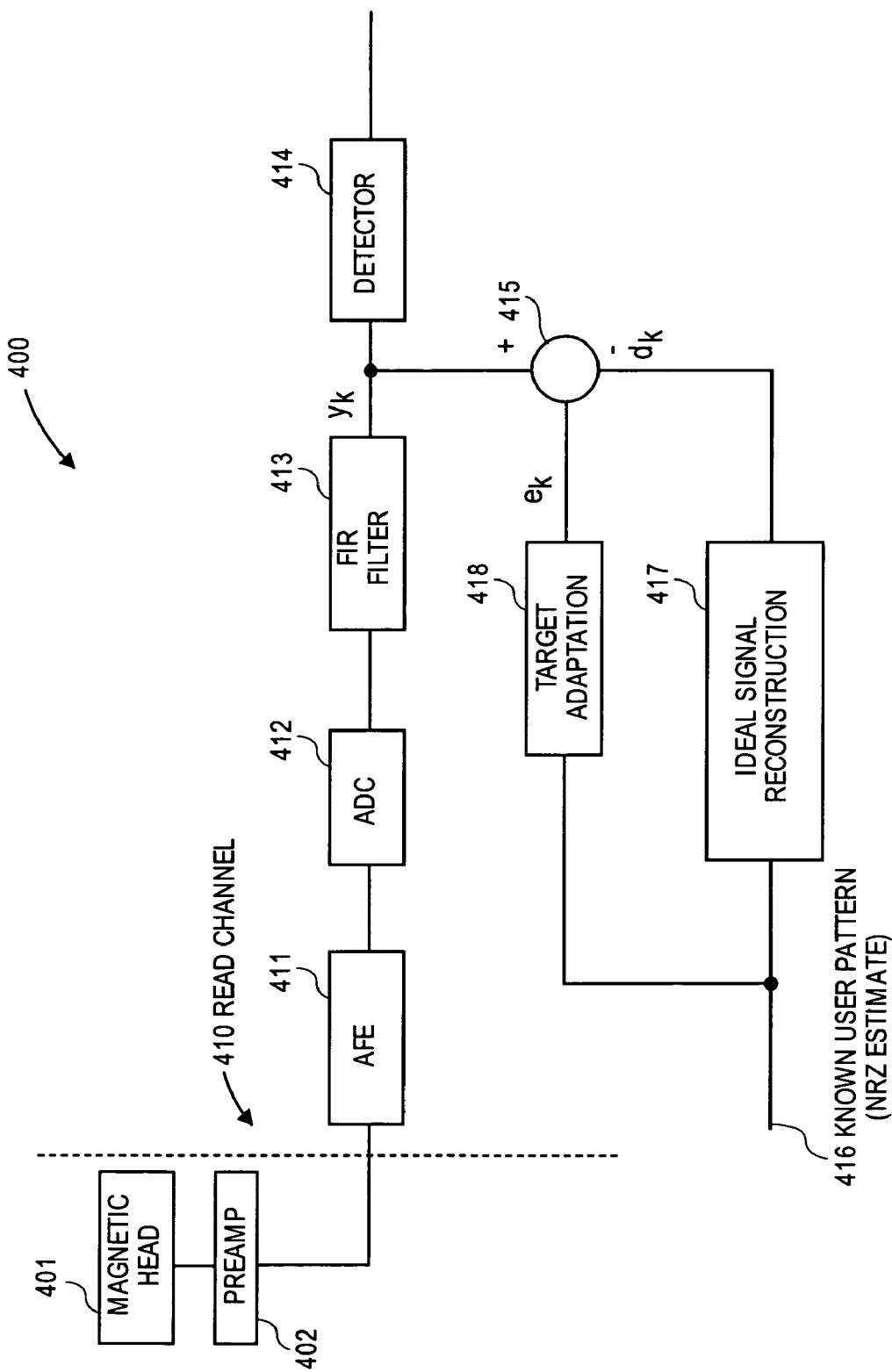
FIG. 4 shows a block diagram of a portion of a disk drive in which a guided target search is used to locate an optimum target for a disk drive.

Referring to FIG. 4, a data read portion of a HDD 400 is shown. In this embodiment, HDD 400 utilizes a magnetic disk medium, although other embodiments may use other types of media. When data is read from a magnetic disk, analog signals are picked up by a magnetic read head 401 and amplified by preamplifier (preamp) 402. Output from preamp 402 is sent to an analog front, end (AFE) 411, which is part of read channel 410 (shown to the right of the dotted line in FIG. 4) of HDD 400. The data input to AFE 411 is an analog signal corresponding to the magnetically aligned data stored on the disk. AFE 411 provides signal shaping and the output from AFE 411 is coupled to an m-tap finite impulse response (FIR) filter 413 represented as $\{f_i\}$, i=0, ..., m−1, via an analog-to-digital converter (ADC) 412. ADC 412 samples the output of AFE 411 and provides a digital signal as input to FIR 413. As described above, channel response includes components of blocks 401, 402, 411, 412, and 413, which a PR target is expected to equalize to.

The input to FIR filter 413 may be characterized by the equation $$a*h+n,$$

where a denotes a sequence of data bits −1 and +1 represented as bi-polar NRZ data, h denotes the head/media and analog part of channel path of the data from block 401 to block 412, n denotes noise and * is a convolution operation. Likewise, the output of FIR filter 413 may also be characterized by the equation $$y=c*(a*h+n)=(c*h)*a+(c*n)=(c*h)*a+n'$$

where y denotes the output of filter 413 and c denotes coefficients of FIR filter 413. Accordingly, as noted in the above equation, FIR filter 413 allows coefficient values to be selected that control channel characteristics, since the channel characteristics is now represented as c*h. This c*h is what the afore-mentioned PR (also pr) target should equalize to. Ideally, the expectation is to have pr=c*h. It is apparent that adjustment of c in digital domain is much easier than attempting to change h in analog domain to obtain a desired output y. Accordingly, selection of a particular pr allows selection of c for a FIR filter.

In FIG. 4, the output of FIR filter 413 is noted as $y_k$ to designate output y having a clock index k, for a given data input a. The output of FIR filter 413 is then coupled to a detector 414, where detection is obtained. Although a variety of detection techniques may be used, a typical detection technique uses Viterbi algorithm to recover the data after equalization by FIR filter 413. Accordingly, in one embodiment of the invention, Viterbi algorithm is utilized to provide detection of the read signal.

In normal operation of the read channel, given a specific HDD with a pre-determined PR target, when data is read from the disk, output y is generated as the equalized output y from FIR filter 413. However, in order for the FIR filter 413 to operate properly, the coefficients of filter 413 should have appropriate values that allow the read channel to yield optimal detection performance. Typically, the optimal performance may be evaluated by metric like BER (other metrics like mean square error (MSE) can also be used). The optimal FIR coefficient values should provide minimum BER. In order to characterize the read channel correctly, which is done typically at time of manufacturer of the HDD, some procedure is performed to select a PR target and the corresponding FIR coefficients. As noted in the Background section above, one of the known techniques available to perform this operation is to provide programmable PR targets and do a brute-force search based on certain metrics (e.g., BER or MSE) during manufacturing to find out the optimal target candidate for a specific channel condition. During the sweep process of PR target, optimal FIR coefficients need to be determined for each PR target. Such approaches have certain disadvantages (e.g., too time consuming). As noted below, embodiments of the present invention use a guided search to select the desired PR target with best match to a specific channel response, which may be done much more efficiently. The optimized target then may be used to determine the coefficient values of FIR filter 413.

Guided target search is done in a regressive process during which an initial target gradually adapts and finally converges to the optimal one. In one embodiment, the adaptation applies least-square-mean (LMS) criterion. For HDD 400 shown in FIG. 4, a data sequence read from the disk is coupled through the read channel and generates the FIR output signal $y_k$ based on an initial set of FIR coefficients selected. Signal $y_k$ is then coupled to a summer 415, as well as to detector 414. In LMS algorithm, PR target adaptation block 418 is driven by an error or correction signal $e_k$ and a bi-polar NRZ bit $b_k$ 416, which can be from a known data stream in manufacturing calibration process or bit estimate from a Viterbi detector in on-the-fly mode. The bit estimate from Viterbi detector may contain some errors and be different from what is actually written on the drive. In block 418, an integration is implemented for each coefficient i of PR target: $tf_{i,k+1} = tf_{i,k} + \mu \cdot e_k \cdot b_{k-i}$ i=0,1, . . . with $tf_{i,k+1}$ being the integrator value, $\mu$ is a programmable updating gain factor, and the integrated term $\{e_k \cdot b_{k-i}\}$, i=0, . . . , n−1 being the gradient, at time index k for tap coefficient $t_i$. The accumulator $tf_{i,k+1}$ can be initialized as $t_i$ or just 0. In the former case, $\{tf_i\}$, i=0, . . . , n−1 is the updated target to be applied. In the latter case, when target update is ready, the new target is $\{tf_i + t_i\}$, i=0, . . . , n−1. The NRZ bit $b_k$ 416 is also sent to an ideal signal reconstruction module 417. Reconstruction module 417 receives the NRZ bit and based on this input sequence, reconstructs a signal $d_k$, $$d_k = \sum_{i=0}^{n-1} b_{k-i} t_i,$$

in which $d_k$ corresponds to what should be an ideal $y_k$ at the output of FIR filter 413 for the particular input sequence. The output $d_k$ is sent to summer 415 and summer 415 then determines the error signal $e_k$ as the difference of $y_k$ and $d_k$ ($e_k = y_k - d_k$).

Accordingly, signal $e_k$ determines the error (or correction value) between what is reconstructed as the ideal output of FIR filter 413 (denoted by signal $d_k$) and what is actually present at the output of FIR filter 413 (denoted by signal $y_k$). Since the error signal $e_k$ indicates the relative closeness of the FIR filter output from the ideal, if the selected target for FIR filter 413 is near the ideal value, the error signal is low. However, if the selected target is off from the ideal value, the error signal indicates the magnitude of the difference between the actual and ideal FIR output. In LMS algorithm, with joint PR and FIR adaptation, the expected value of error signal square is minimized $$\left(\text{i.e., } \underset{\{t_i\},\{f_j\}}{\operatorname{argmin}}\{E(e^2)\}, i = 0, \ldots, n-1, j = 0, \ldots, m-1\right)$$

when PR and FIR adaptation converges to their optimum settings $\{t_i\}$, i=0, . . . , n−1 and $\{f_j\}$, j=0, . . . , m−1 respectively. The error signal $e_k$ is coupled to a target adaptation module 418 to adjust the PR target to select a target that reduces the amount of error $e_k$.

Target adaptation module 418 may utilize a variety of techniques to implement target adjustment to lower $e_k$ to an acceptable level. In one set of embodiments noted below, target adaptation module 418 uses a guided search to search for a target that is optimal for the particular HDD. Generally, the guided search to identify a suitable PR target for use with FIR filter 413 is obtained by observing the gradients $\{e_k \cdot b_k\}$, i=0, . . . , n−1 for a given PR target. It is to be noted that components of read channel portion 418 of HDD 400 may be implemented in hardware, firmware, software or a combination thereof.

Figure 5:
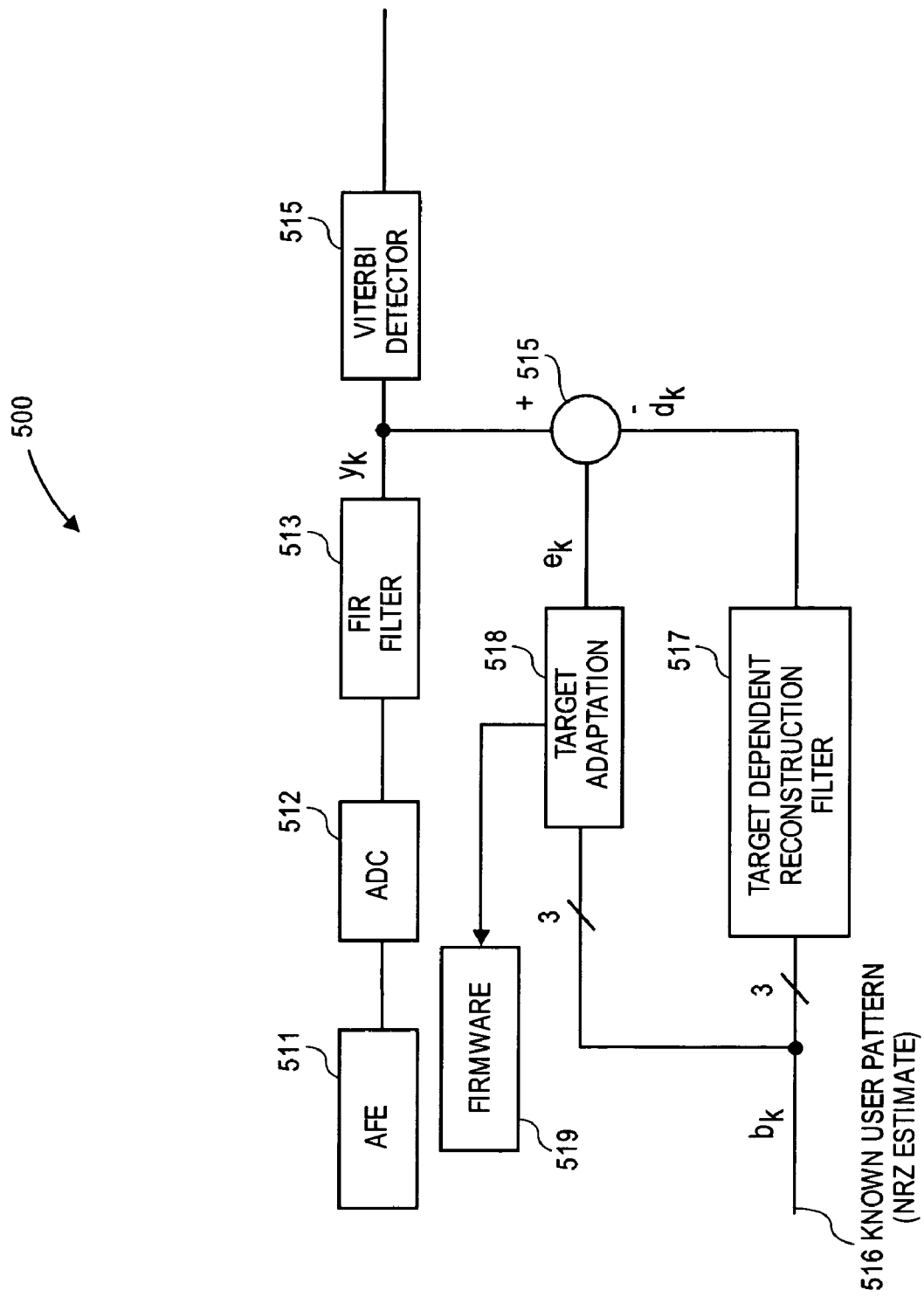
FIG. 5 shows a block diagram of another embodiment for performing a guided search to locate a target for a disk drive.

FIG. 5 shows a data read portion of a HDD 500. AFE 511, ADC 512, FIR filter 513, Viterbi detector 515, summer 515 are respectively equivalent to AFE 411, ADC 412, FIR filter 413, detector 414 and summer 415 of FIG. 4. Ideal signal reconstruction module 417 is implemented as a target dependent reconstruction filter module 517, that receives a NRZ Estimate input 516, also noted as $b_k$. Also for HDD 500, $b_k$ and $e_k$ are coupled to a target adaptation module 518. In one embodiment for the data read portion of HDD 500 shown in FIG. 5, the various components shown are implemented in hardware. Target adaptation module 518 is coupled to firmware 519 and the two modules operate to provide the gradient search to find the optimum target for use with FIR filter 513.

It is to be noted that the read channel components shown in FIGS. 4 and 5 may be implemented in many ways. The components of FIG. 4 or 5 are generally implemented in a read channel portion of a device, such as disk controllers 210 and 310 of FIGS. 2 and 3. The firmware may be incorporated in a processing device, or a program that is stored in memory to operate with a processing device. That is, many embodiments may be implemented to practice the present invention. The following description describes one set of embodiments that may be implemented to practice the present invention. The embodiments are described in reference to FIG. 5.

In order to provide equalization for a read channel of a magnetic HDD, in one embodiment an acceptable result is obtained by use of a 3-tap FIR filter. With a three tap filter, three coefficients are made programmable so that the FIR filter equalizes to a programmable $(t_0 + t_1 D + t_2 D^2)$ target, where $t_0$, $t_1$ and $t_2$ represent the coefficient values and D and $D^2$ represent delay values of the filter taps. In one embodiment, each of the coefficients $t_0$, $t_1$, $t_2$ are represented by a signed six-bit value so that 262,144, $(2^6)^3$, (noted as 256K) targets are possible. Further, the output of FIR filter is also represented as a signed six-bit signal. In one embodiment, the six bits are used for fixed-point precision only. In other embodiments where higher precision is desired, more bits may be used or less bits for lower precision implementation.

With the coefficients allowing for 256K different combinations, a search through all of the targets in order to determine an appropriate PR response for a given read channel characteristic is time consuming and cost ineffective. Accordingly, in one embodiment for practicing the invention, a constraint (or constraints) may be imposed to narrow down the target selection. With the six-bit FIR output signal, the following formula may be used to select a range for the targets:

$20 \leq (\text{abs}(t_0) + \text{abs}(t_1) + \text{abs}(t_2)) \leq 28$, where abs stands for absolute value.

The above formula generally assures the use of full six-bit precision with the lower boundary and avoids significant signal clipping at the upper boundary in fixed-point channel implementation. Essentially, since only a limited number of targets may provide good performance for the filter, a range of targets is selected to reduce the search. It is to be noted that other embodiments may select different boundaries or even use different criteria for choosing a range. The above formula is just one example of how a range of targets may be selected to reduce the set of targets that will be searched from all possible targets.

Furthermore, it is to be noted that the good target selection may depend on the magnetic alignment of the particular HDD to which target adaptation is being performed. For example, with disks having longitudinal alignment and no direct current (DC) component (DC-free target), a 3-tap filter is used, but with a perpendicular alignment, a filter with only 2 taps may be adequate ($t_0 + t_1 D$). Although the selection of a number of good targets may depend on the system and the constraints imposed, it may be generalized that only a limited number of targets provide good performance for a particular HDD.

Figure 6:
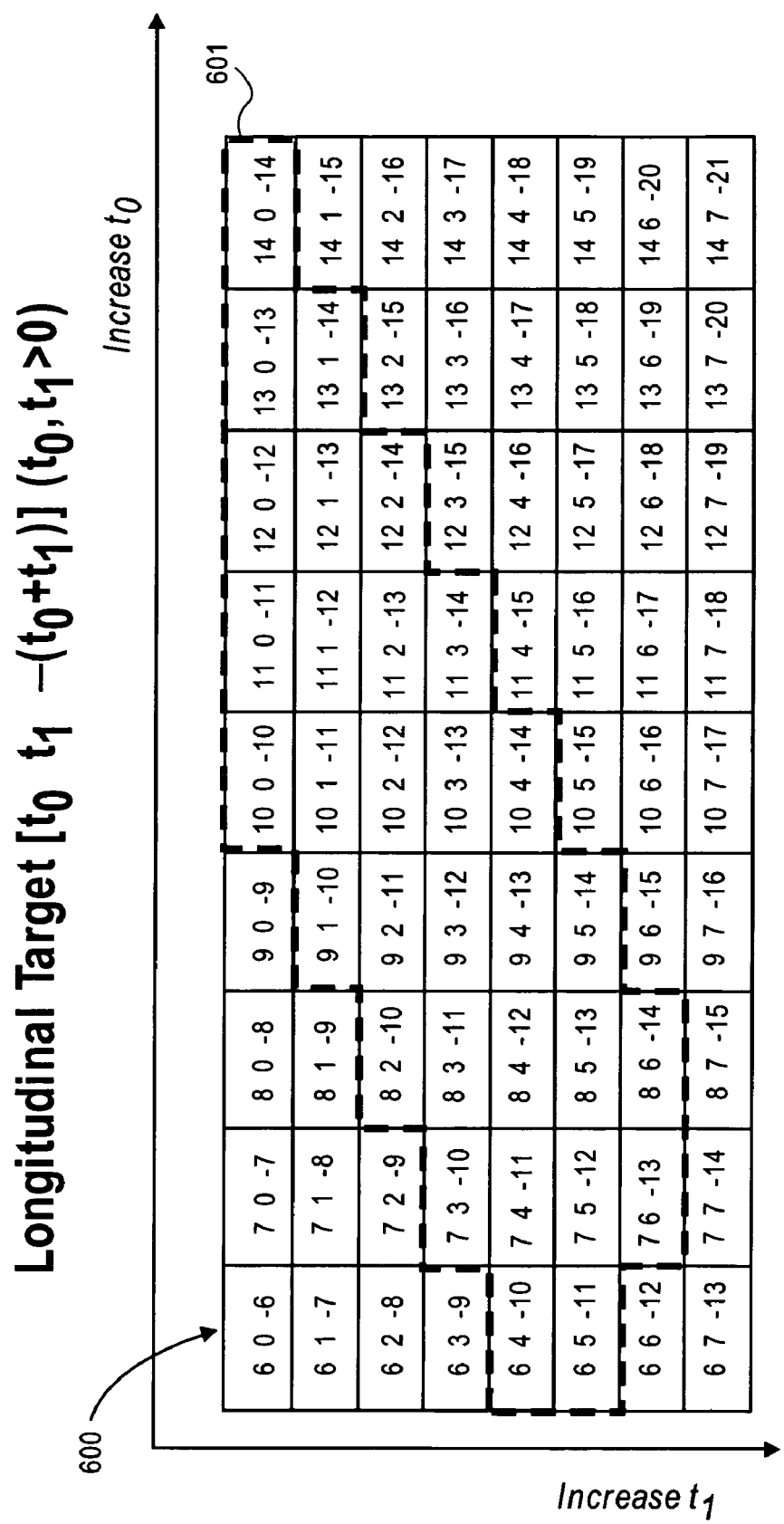
FIG. 6 shows an embodiment of a look up table for locating a 3-tap longitudinal target.

One example embodiment for identifying a selection of what is considered a good target is illustrated in FIG. 6 for a longitudinally aligned disk. The target selection is based on 3 taps $t_0$, $t_1$ and $t_2$, but $t_2$ is made dependent on $t_0$ and $t_1$. Specifically, $t_2$ is defined as $t_2 = -(t_0 + t_1)$ to make sure there is DC null in the target spectrum, so only two coefficient factors are considered. The three target values are noted as $[t_0 \, t_1 \, -(t_0 + t_1)]$. It is possible that $t_0 > 0$ and $t_1 \geq 0$, in which case the target is a maximum phase target. If $t_0 > 0$ and $t_1 \leq 0$, the target is a minimum phase target. Since for any maximum phase target $[t_0 \, t_1 \, -(t_0 + t_1)]$, there is a corresponding minimum phase target $[t_0' \, t_1' \, -(t_0' + t_1')] = [t_0 + t_1 \, -t_1 \, -t_0]$ with the same amplitude of PSD, e.g., [11 −1 −10] vs. [10 1 −11], without loss of generalization, a maximum phase target is used as an example here with $t_0 > 0$, $t_1 \geq 0$. While applying the above range of 20-28 the lower acceptable boundary is established as $\text{abs}(t_0) + \text{abs}(t_1) + \text{abs}(-(t_0 + t_1)) \geq 20$, i.e., $t_0 + t_1 \geq 20/2$; the upper acceptable boundary is established as $\text{abs}(t_0) + \text{abs}(t_1) + \text{abs}(-(t_0 + t_1)) \leq 28$, i.e., $t_0 + t_1 \leq 28/2$. Furthermore, a target with good spectrum matching channel response is expected. In one example embodiment, $t_0$ is set to be $t_0 > t_1$ so that not too excessive Nyquist energy in target's power spectrum density (PSD) function, which match most of Longitudinal HDD channels.

Look up table 600 in FIG. 6 shows various targets that may be available for use as longitudinal maximum phase targets. Table 600 is arranged having a target in each box (entry). For each entry, the first number is $t_0 (>0)$, the second number is $t_1 (\geq 0)$ and the third number is $-(t_0 + t_1)$. Accordingly, for the top left most entry, the numbers are $t_0 = 6$, $t_1 = 0$ and $-(t_0 + t_1) = -6$. The $t_0$ values increase by 1 for each entry when moving from left to right and the $t_1$ values increase by 1 for each entry when moving from top to bottom. The third number changes respectively. The various entries of table 600 may be stored in some medium, such as memory, register, etc. It is to be noted that table 600 may be enlarged to accommodate further entries (or made smaller), depending on the constraints chosen for selecting the good targets. Also, table 600 only shows the positive signed $t_0$, $t_1$ values $[t_0 > 0, t_1 \geq 0]$ for maximum phase targets and its 'mirror' table for minimum phase targets $[t_0' \, t_1' \, -(t_0' + t_1')]$ can be obtained with mapping $[t_0' \, t_1' \, -(t_0' + t_1')] = [t_0 + t_1 \, -t_1 \, -t_0]$.

Using the constraints noted above $[(10) \leq (\text{abs}(t_0) + \text{abs}(t_1)) \leq (14)]$ and $t_0 > t_1 \geq 0$, boundary 601 identifies those targets that are deemed to be good targets and meet the constraints. Therefore, those targets within boundary 601 are regarded as acceptable targets. As can be interpolated, with both the positive table 600 and its negative equivalent, the number of total entries is much less than the possible 256K entries.

In FIG. 7, look up table 700 shows various 2-tap targets that may be available for use in a perpendicularly aligned disk. As noted above, only two coefficients are used, since in most cases a 2-tap FIR filter is adequate to provide good performance used for perpendicularly aligned disks. One example embodiment for identifying a selection of what is considered a good target for perpendicular targets is illustrated in FIG. 7. The target selection is based on two taps $t_0$ and $t_1$, with the additional constraint that $t_1 > 0$, and $t_0 > 0$ as well as $t_1 < 2t_0$ for good PSD with no DC suppression and no excessive Nyquist energy, which match most of Perpendicular HDD channels for maximum phase target. Furthermore, without loss of generality, apply a constraint of $t_1 \geq t_0$. Similarly, a 'mirror' target $[t_0' \, t_1']$ can be obtained with a simple mapping $[t_0' \, t_1'] = [t_1 \, t_0]$, e.g., [10 12] vs. [12 10]. In selecting the good targets, the above range of 20-28 is used. Thus, the lower acceptable boundary is established as $t_0 + t_1 \geq 20$ and the upper acceptable boundary is established as $t_0 + t_1 \leq 28$.

Table 700 in FIG. 7 shows various targets that may be available for use as perpendicular targets. Table 700 is also arranged having a target in each box (entry). For each entry, the first number is $t_0$ and the second number is $t_1$. Accordingly, for the top left most entry, the numbers are $t_0 = 7$, $t_1 = 7$. The $t_0$ and $t_1$ values both increase by 1 for each entry when moving from left to right and the y values increase by 1 for each entry when moving from top to bottom. The various entries of table 700 may be stored in some medium, such as memory, register, etc. It is to be noted that table 700 may be enlarged to accommodate further entries (or made smaller), depending on the constraints chosen for selecting the good targets. Likewise, table 700 only shows the $t_0$, $t_1$ values $[t_1 \geq t_0]$ and its 'mirror' target table $[t_0' \, t_1']$ can be obtained with mapping $[t_0' \, t_1'] = [t_1 \, t_0]$. Using the constraints noted above $[20 \leq (\text{abs}(t_0) + \text{abs}(t_1)) \leq 28]$, $2t_0 > t_1 \geq t_0 > 0$, boundary 701 identifies those targets that are deemed to be good targets and meet the constraints. Therefore, those targets within boundary 701 are regarded as acceptable targets.

Similar techniques may be used for 3-tap targets $[t_0 \, t_1 \, t_2]$ for Perpendicular HDD. Unlike the 3-tap DC-free targets for Longitudinal HDD with only 2 independent coefficients, for Perpendicular use, all 3 coefficients are independent. The extended table for $[t_0 \, t_1 \, t_2]$ may be built (but not limited) on the base of Table 700 while taps $[t_0 \, t_1]$ for 2-tap cases are right-shifted as $[t_1 \, t_2]$ for 3-tap cases. For example, extended from target [10 17], a valid 3-tap target (satisfying constraints stated above) may be [1 10 17] or [−1 10 17]. Actually Table 700 may be viewed as a special table for 3-tap target $[t_0 \, t_1 \, t_2]$ with $t_0 = 0$. The boundary 701 may be also expanded due to a non-zero first tap $t_0$. For example, target [8 11] may not be a preferred target since it does not satisfy lower-bound constraint, but [1 8 11] becomes good by adding one non-zero tap. A 3-tap target with good PSD usually has the first tap being a minor tap, which is much smaller than the other two.

Similarly, a 'mirror' table for target [$t_0'$ $t_1'$ $t_2'$] can be built through mapping [$t_0'$ $t_1'$ $t_2'$]=[$t_2$ $t_1$ $t_0$].

In order to determine which target from the list of targets in the target look up table, such as table 600 or table 700, is optimum for the particular HDD, some converging technique is used to converge to an optimum target. As noted above, in one embodiment of the invention, a least mean square (LMS) adaptation technique is used. That is, for a given h, a search for an appropriate target pr is performed, so that c may be determined since pr=c*h. In reference to FIG. 5, $e_k$ may be determined by $$e_k = y_k - d_k$$

where $d_k$ is $$d_k = t_0 \cdot b_k + t_1 \cdot b_{k-1} + t_2 \cdot b_{k-2} \text{ for a 3-tap filter, and}$$

$$(d_k = t_0 \cdot b_k + t_1 \cdot b_{k-1} \text{ for a 2-tap filter})$$

The $d_k$ value is provided by target dependent reconstruction filter 517.

Again, $t_0$, $t_1$ and $t_2$ are coefficient values and k is a clock index for determining delays. The variable $b_k$ represents NRZ bits, +1 and −1. There are totally eight different combinations for [$b_k$ $b_{k-1}$ $b_{k-2}$] (from −1,−1,−1 to +1,+1,+1). Thus, for a given [$t_0$ $t_1$ $t_2$], $d_k$ has 8 possible values. In implementation, rather than do reconstruction filtering every time, an 8-entry look-up table for $d_k$ can be used with index being [$b_k$ $b_{k-1}$ $b_{k-2}$] at each time k.

In performing the LMS target adaptation, a particular target is selected and reconstruction filter 517 uses the target value to generate $d_k$ based on input [$b_k$ $b_{k-1}$ $b_{k-2}$]. Substantially at the same time FIR filter 513 reads the data and generates $y_k$. Summer 515 generates the corresponding $e_k$. Target adaptation module 518 receives $e_k$ and [$b_k$ $b_{k-1}$ $b_{k-2}$] and determines a gradient vector that indicates the expected value change in the $t_0$, $t_1$, $t_2$ values ($t_0$, $t_1$ only for 2-tap filter). This vector is coupled to firmware module 519, which then programmably processes the vector. The gradient indicates direction of movement of the error and if the error is becoming smaller (smaller gradient value) or larger (larger gradient value). When the gradient converges to a zero slope value, the appropriate optimum target is noted.

A variety of LMS techniques may be utilized, as well as other techniques, to derive the gradient vector. In one embodiment, target adaptation unit uses an accumulator to measure the changes of the $t_0$, $t_1$, $t_2$ values as the targets are changed:

$$[t_0\ t_1\ t_2] \rightarrow [t_0 + \Delta t_0\ t_1 + \Delta t_1\ t_2 + \Delta t_2], \text{ where}$$

$$\Delta t_0 = \mu \cdot e_k \cdot b_k;\ \Delta t_1 = \mu \cdot e_k \cdot b_{k-1};\ \Delta t_2 = \mu \cdot e_k \cdot b_{k-2}$$

where μ is an updating gain.

In performing the LMS adaptation technique noted above, one freedom degree is removed to avoid converging to a trivial all-zero solution. This may be achieved by normalizing over, for example, the first tap, $t_0$. Accordingly:

$$(t_0 + t_1 D + t_2 D^2) \text{ becomes } (1 + (t_1/t_0)D + (t_2/t_0)D^2) \text{ or}$$

$$(t_0 + t_1 D) \text{ becomes } (1 + (t_1/t_0)D)$$

While any tap may be used for normalization, practically, it is preferred to use the main tap, i.e., the maximum tap. If need be, tap ratios may be approximated and/or proportioned by a multiplying factor to obtain the needed normalized values. By normalizing, the good target candidates may be sorted in an incremental order of $t_1/t_0$ or orders of $t_1/t_0$ and $t_2/t_0$. In one embodiment, the quantized target table may have almost linear ratio values.

Figure 8:
FIG. 8 shows an embodiment of a target table having acceptable targets sorted in a linear order.

FIG. 8 shows a normalized table 800 which has various $t_0$, $t_1$ values, which $t_0$, $t_1$ values may correspond to $t_0$, $t_1$ values of table 600 or 700 or its 'mirror' table. Table 800 has the corresponding $t_1/t_0$ values as well. The values may be pre-loaded, or subsequently generated and loaded, depending on the table used and the constraints used in selecting targets from a particular table. As noted, the $t_1/t_0$ values may be sorted in magnitude order. This sorted and quantized table 800 presents a linear gradient so that a gradient search may be performed to obtain the desired target. Thus, when performing the search for the desired optimum target, target selection may be made linearly across the values of $t_1/t_0$ as the gradient vector changes in value.

For example, a target may be selected and evaluated for its LMS gradient. Subsequently, another target may be selected and evaluated for its LMS gradient. If the search for the optimum target is in the correct direction, LMS gradient becomes smaller. If the search is in the wrong direction, LMS gradient becomes larger. At some point, the optimum target is identified when the gradient change (gradient slope) approaches zero.

Figure 9:
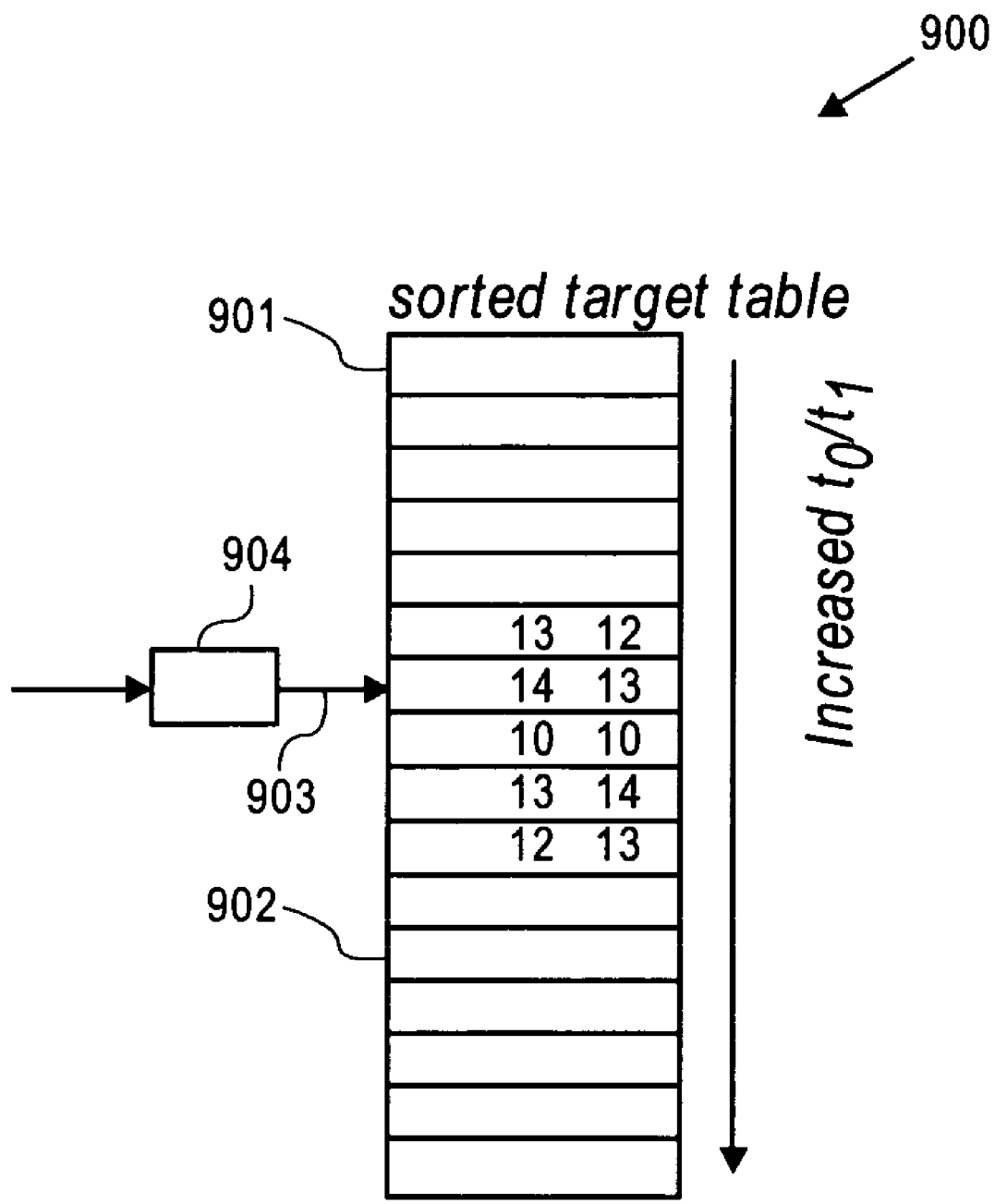
FIG. 9 shows an example of moving along the sorted target table of FIG. 8 based on a gradient analysis to search for an optimum target.

A variety of techniques may be operable to perform the gradient search. FIG. 9 shows one embodiment of an apparatus that may be used to select the desired target when there is only two freedom degrees in the targets, for example, the targets may be sorted in one dimension of $t_1/t_0$. Apparatus 900 includes a sorted target table 901 having entries 902 to store $t_0$ and $t_1$ values. The $t_0$, $t_1$ combinations are calculated and programmed into entries 902 (although the values may be pre-loaded) and those entries may correspond to the combinations noted in the boundary 601, 701 of table 600, 700, or to some other table developed with other target constraints. The entries 902 are stored in a linearly sorted order, such as the y/x gradient order noted in table 800 of FIG. 8.

A pointer 903 is coupled to table 900 and used as a pointer to point to one of the entries. Initially, pointer 903 points to the starting target. The pointer is coupled to a direction module 904, which receives a signal from the firmware in response to the generated gradient vector. Direction module 904 (which may be part of the firmware) is operable to respond to the determination of the gradient and in which direction to move along the $t_1/t_0$ values based on the gradient. Once the firmware determines the direction of the next target to be selected, a corresponding indication to the direction module moves the pointer up or down to obtain the next adjacent target. In one embodiment, direction module 904 accepts LMS gradient and calculates the new tap ratio $(t_1+\Delta t_1)/(t_0+\Delta t_0)$. As to how to decide on next target, in one embodiment, a look-up table of $t_1/t_0$ may be used to find the target giving the closest tap ratio to $(t_1+\Delta t_1)/(t_0+\Delta t_0)$ and the point may be moved to that target directly. In another embodiment, direction module 904 only compares $(t_1+\Delta t_1)/(t_0+\Delta t_0)$ with $t_1 t_0$ to see which one is larger. If the new tap ratio is larger, direction module 904 generates a '+' sign indicating the movement in the pre-sorted table along the incremental direction of $t_1/t_0$; otherwise, it generates a '−' sign and does an opposite movement. The values noted in some of the entries of table 901 in FIG. 9 correspond to those entries noted in table 800 of FIG. 8. Eventually, the optimum target is found. In one embodiment, the stop criterion can be that the gradient used to drive movement becomes vaguer and vaguer, which is determined by examining whether the gradient is smaller than a pre-set threshold. In another embodiment, several consecutive movements are observed and if they are just back and forth around a certain target.

Figure 10:
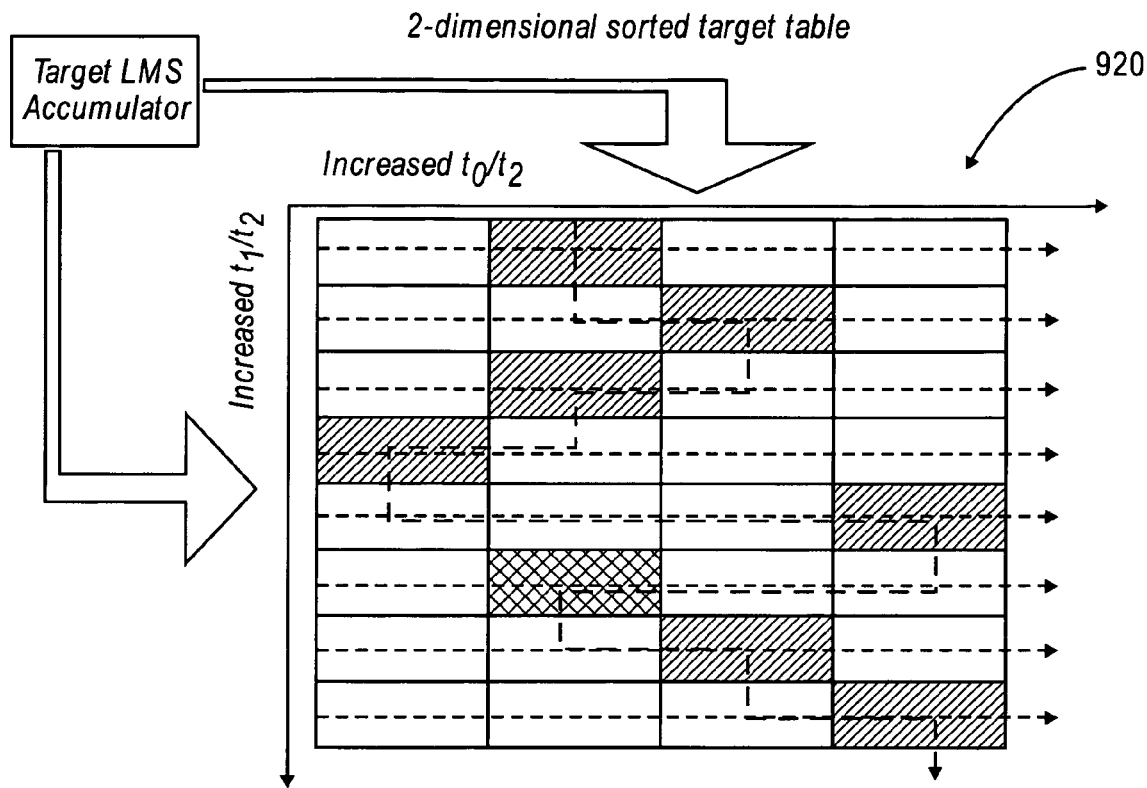
FIG. 10 shows an example for gradient guided search for 3-tap Perpendicular targets.
Figure 11:
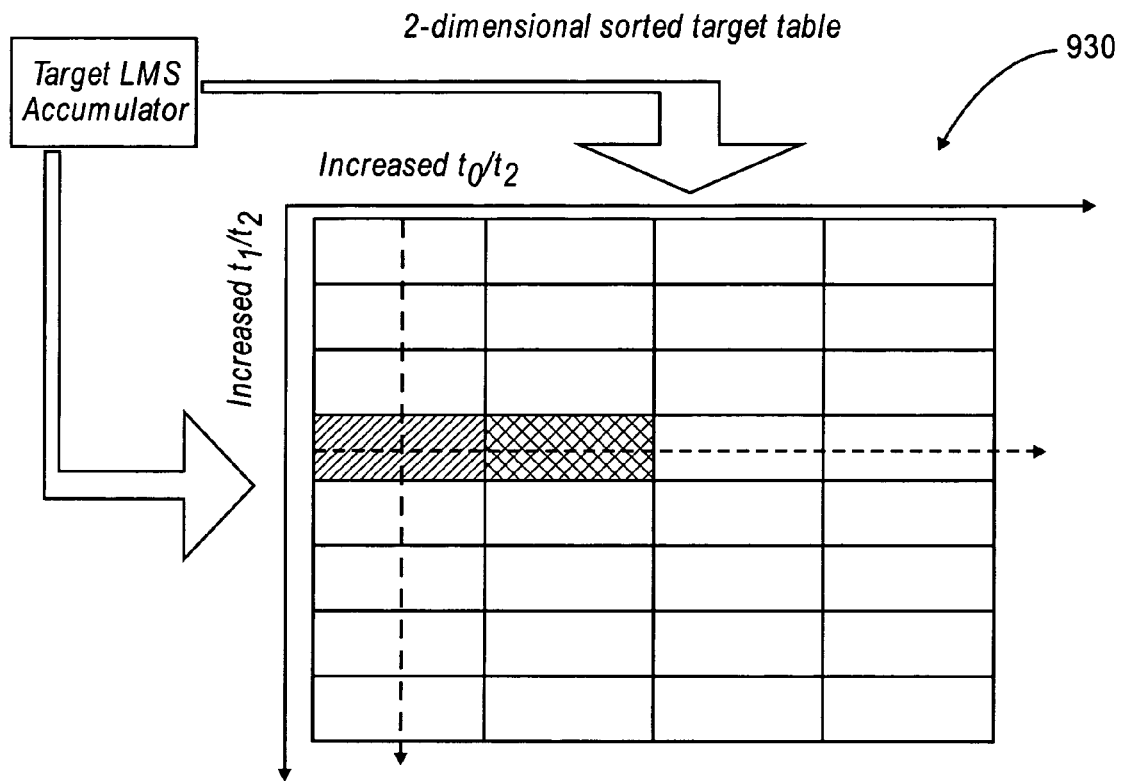
FIG. 11 shows another example for gradient guided search for 3-tap Perpendicular targets.
Figure 11:
Figure 11:

It is to be appreciated that the described target search noted above is but one embodiment for implementing the present invention. Other approaches may be implemented as well to provide a gradient guided target search. For example, if a 3-tap target is used for a perpendicularly aligned disk, as shown in diagram 920 of FIG. 10, a linear gradient guided search may be performed first horizontally based on tap ratio $t_0/t_2$, and row-by-row. In each row operation, an optimum first tap $t_0$ is found for each 2-tap target $[t_1 \ t_2]$ and a sub-optimum target $[t_0 \ t_1 \ t_2]$ may be located. Then an optimum one may be found by doing linear gradient guided search among all the sub-optimum targets along vertical direction and based on tap ratio $t_1 t_2$. This allows a search over two degrees of freedom, instead of the single degree of freedom noted in table 800. In another embodiment, a simplified and sub-optimal approach is used as shown in diagram 930 of FIG. 11. In this approach, a linear gradient guided search is performed first vertically based on tap ratio $t_1/t_2$ and only for targets with $t_0=0$. Then for the optimum 2-tap target $[0 \ t_1 \ t_2]$, a guided search is done based on tap ratio $t_0 t_2$ to find the optimum first tap $t_0$. It is to be noted various other techniques may be implemented to a gradient guided target search.

The guided search for a target may be performed in a variety of ways and for a variety of reasons. In one technique, a guided search is performed to determine an optimum target for a magnetic HDD during manufacture of the HDD. For example, a manufacturer of a disk controller chip, such as a disk controller SOC noted in FIG. 2 or 3, may supply the chip to a number of disk drive manufacturers. It is desirable to have the controller chip operate with the different HDD designs. Since disk designs are different, the channel response of the various HDD devices most likely will be different, resulting in a different desired PR. A disk controller chip that is flexible in design would accommodate these differences to select a target that is optimum for the particular HDD device. Furthermore, it would be advantageous if the target selection is obtained quickly without incurring undue time in searching for the optimum target.

Figure 12:
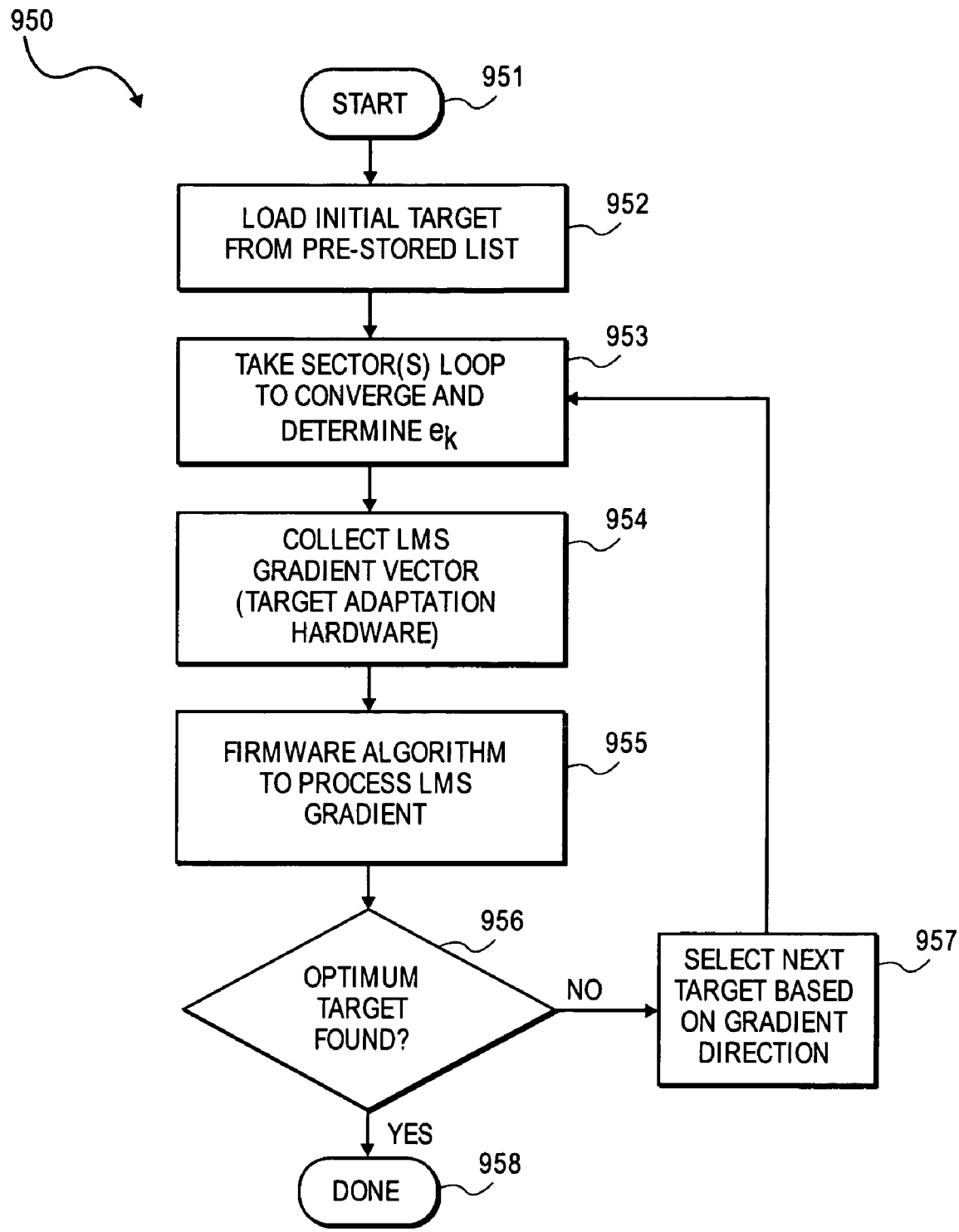
FIG. 12 is a flow chart showing one example technique in performing a guided search to obtain a target for a HDD during manufacture of the HDD.

A guided target search, as described above, allows a more rapid approach to search for the target, since not all possible targets are searched. Accordingly, one embodiment of a technique to perform a guided search is illustrated in diagram 950 of FIG. 12. After starting a target selection routine (block 951), an initial target is loaded from a pre-stored list of targets. The pre-stored list of targets may reside on the disk controller chip or elsewhere off the chip. Targets from tables 600, 700 are examples of targets that may be used. The acceptable targets, such as those within boundaries 601, 701, are pre-sorted into a table, such as gradient table 800 of FIG. 8.

Then, an initial target is loaded from the pre-sorted list (block 952). It may take a whole sector or sectors to have loops converged by reading data from the disk. For example, the FIR filter adaptation uses a similar LMS algorithm by minimizing square of $e_k$, the difference between $y_k$ and the ideal NRZ value $d_k$ (block 953). Upon convergence of loops, LMS gradient vector for target adaptation is then collected over a whole sector or multiple sectors in the target adaptation hardware (block 954) and sent to the firmware to determine the amount and direction of the change (block 955). If the gradient results indicate that an optimum target has been found (block 956), the target search is completed (block 958). Otherwise, a next target is selected based on the gradient direction (block 957). With the example table 900, the next target would be the adjacent target in the pre-sorted list. Which adjacent target depends on the direction of the gradient movement. Then, the sequence of events of blocks 953-957 are repeated, until an optimum target is found.

In another technique, the gradient value may be monitored during operation of the HDD to determine if the originally selected optimum target is still correct. This is typically done once the HDD is made operational and operating in its normally intended environment. During the life of the HDD, routines may be run at periodic times to monitor and record the LMS values. If the mean of gradient values remains substantially constant, then the HDD is operating within the originally determined channel characteristic. However, if the mean of gradient has changed or is changing over time, the channel characteristic may be changing for the HDD. The originally selected optimum target may no longer be optimum. In this event, the technique described above may be run to find a revised optimum target for the HDD.

Thus, a guided target search for a HDD is described. The technique is not limited to HDDs or other disk drives only. The guided search for a target may be used for other devices that have a channel that receive data input, where the channel h may be adapted. For example, wireless communication devices that use equalization in the receiver input may utilize the search technique to characterize the receiver receive data channel.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items.

Furthermore, the term "module" is used herein to describe a functional block and may represent hardware, software, firmware, etc., without limitation to its structure. A "module" may be a circuit, integrated circuit chip or chips, assembly or other component configurations. Accordingly, a "processing module" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions and such processing device may have accompanying memory. A "module" may also be software or software operating in conjunction with hardware.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. Similarly, flow diagram blocks and methods of practicing the embodiments of the invention may also have been arbitrarily defined herein to illustrate certain significant functionality. To the extent used, the flow diagram block boundaries and methods could have been defined otherwise and still perform the certain significant functionality. Such alternate definitions of functional building blocks, flow diagram blocks and methods are thus within the scope and spirit of the claimed embodiments of the invention. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. An apparatus comprising:
   a filter disposed in a read channel to filter incoming data and to generate an equalized output;
   a reconstruction module to reconstruct the channel and filter characteristics based on a partial response target selected for the filter and to generate an ideal reconstructed output; and
   a target adaptation module coupled to receive an NRZ bi-polar bit and an error signal which indicates a difference between the filter output and the output of the reconstruction module, the target adaptation module to generate gradient vectors based on inputs, the target adaptation unit to perform a guided search by processing gradient vectors to determine an optimum target from a plurality of selected targets for use with the filter.

2. The apparatus of claim 1, wherein the target adaptation module includes a sorting table to store the plurality of selected targets, in which the selected targets are stored in one or more linear gradient order to perform the gradient search by linearly moving along the stored selected targets.

3. The apparatus of claim 2, wherein the target adaptation module further includes a look up table to store a pool of potential targets for the filter, in which the selected targets are selected from the pool of targets in the look up table based on constraints imposed on the target.

4. The apparatus of claim 3 wherein the pool of potential targets correspond to targets for a longitudinally aligned magnetic disk of a disk drive device.

5. The apparatus of claim 4 wherein the filter is a 3-tap finite impulse filter, in which the pool of potential targets has three coefficients, but a third coefficient value is dependent on a first and second coefficient values.

6. The apparatus of claim 5 wherein the sorting table is normalized over the first coefficient and ordered linearly over normalized values.

7. The apparatus of claim 3 wherein the pool of potential targets correspond to targets for a perpendicularly aligned magnetic disk of a disk drive device.

8. The apparatus of claim 7 wherein the filter is a 2-tap finite impulse filter, in which the pool of potential targets has two coefficients.

9. The apparatus of claim 8 wherein the sorting table is normalized over the first coefficient and ordered linearly over normalized values.

10. The apparatus of claim 7 wherein the filter is a 3-tap finite impulse filter, in which the pool of potential targets has three coefficients.

11. The apparatus of claim 10 wherein the 2-dimensional table is sorted with the second coefficient and the third coefficient normalized over the first coefficient and ordered linearly over normalized values respectively.

12. The apparatus of claim 2, wherein the target adaptation module determines a gradient vector for a particular target selected for the filter in hardware and couples the vector value to firmware to determine which direction to traverse along the plurality of targets in the sorting table to select a next target for the filter.

13. The apparatus of claim 12, wherein the targets corresponds to partial response of channel and filter characteristics for a disk drive device.

14. A method comprising:
   (a) loading an initial target from a sorted list of selected partial response targets corresponding to channel and filter characteristics of a read channel for incoming data from a disk storage medium;
   (b) taking a sector or sectors for loops to settle from the disk storage medium through the read channel and filter;
   (c) reconstructing the channel and filter characteristics based on a partial response target selected for the filter and generating an ideal reconstructed filter output;
   (d) determining a difference between the filter output and the reconstructed output;
   (e) obtaining a gradient vector based on the difference to perform a guided gradient search from a plurality of selected targets resident in a sorting table, in which the selected targets are stored in a linear gradient order;
   (f) determining if the target is an optimum target for the filter; and
   (g) determining which direction to search in the sorting table by changes in the gradient vector and selecting another target from the sorted list of targets and repeating (b)-(f), if the target in (f) is not an optimum target.

15. The method of claim 14 wherein obtaining the gradient vector includes applying a least mean square criterion to determine the gradient vector.

16. The method of claim 14 wherein taking a sector or sectors for loop to settle from the disk storage medium through the read channel and filter is through a 3-tap finite impulse filter, in which targets corresponding to the 3-tap filter use three coefficient values, but a third coefficient value is dependent on a first and second coefficient values, the 3-tap filter for use with a longitudinally aligned magnetic medium.

17. The method of claim 14 wherein taking a sector or sectors for loops to settle from the disk storage medium through the read channel and filter is through a 2-tap finite impulse filter, in which targets corresponding to the 2-tap filter use two coefficient values, the 2-tap filter for use with a perpendicularly aligned magnetic medium.

18. The method of claim 14 wherein taking a sector or sectors for loop to settle from the disk storage medium through the read channel and filter is through a 3-tap finite impulse filter, in which targets corresponding to the 3-tap filter use three coefficient values, the 3-tap filter for use with a perpendicularly aligned magnetic medium.

19. The method of claim 14 wherein the sorted list of selected targets is normalized over a first coefficient of the filter and ordered linearly over normalized values.

* * * * *